Nov. 14, 1939.  M. P. PALSSON  2,179,597
HARPOON SPOON
Filed Feb. 2, 1938
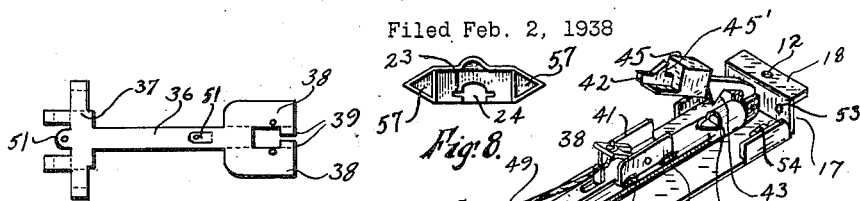
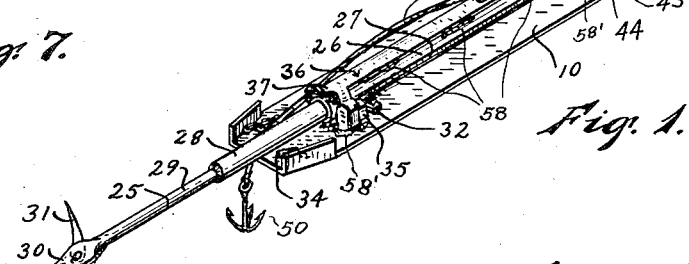
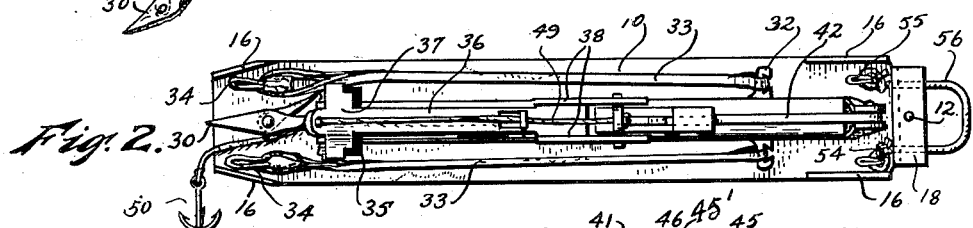
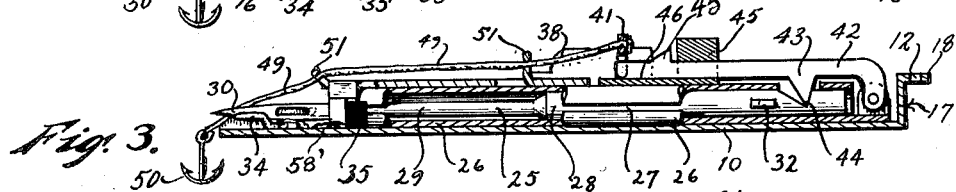
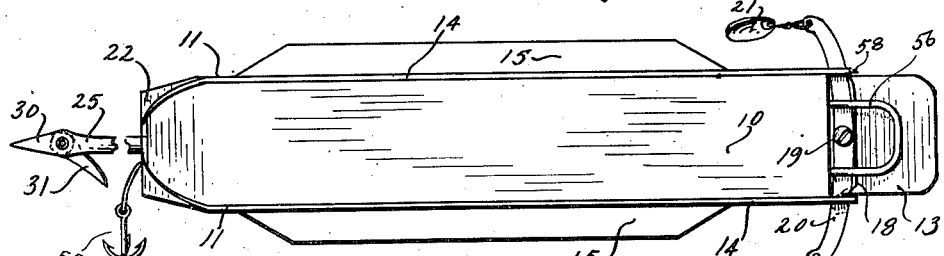
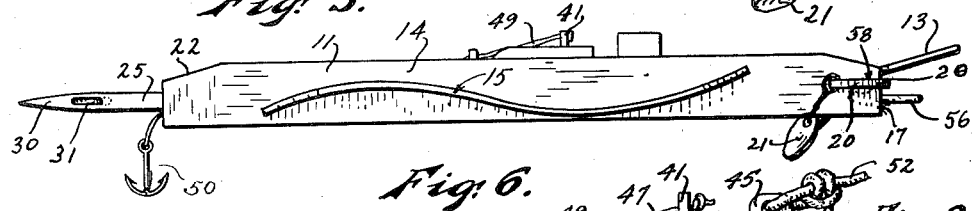
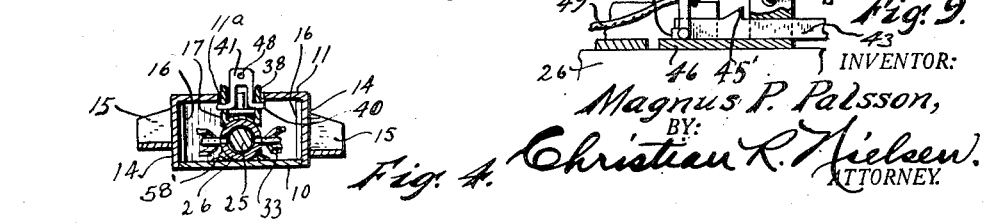
INVENTOR:
Magnus P. Palsson,
BY: Christian R. Nielsen.
ATTORNEY.

Patented Nov. 14, 1939

2,179,597

UNITED STATES PATENT OFFICE 2,179,597

HARPOON SPOON

Magnus P. Palsson, Seattle, Wash.

Application February 2, 1938, Serial No. 188,359

14 Claims. (Cl. 43—6)

The invention relates to fish lures and snaring devices, and has for an object to provide a device operative with the function of a spoon, and which at the same time will add to the certainty of the catch in case a fish nibbles at the bait without swallowing it, as well as when the fish strikes.

It is also an important object to minimize the liability of loss of spoons, lures or the lines by exertions of the fish when hooked or caught by my device.

A further aim is to present a device which will be an effective lure at the same time that it operates to assure the catch when a fish nibbles or strikes, or is snagged.

It is an important purpose of the invention to present a humane fish snaring device such as a hook and line which will shorten the suffering of a fish when caught.

A still further object of the invention is to present a novel means for snaring a fish by a hook-released harpoon element which may be readily embodied in a spoon device attachable to ordinary lines for use with ordinary rods, or on hand lines.

It is also an aim to present such an appliance which may be used with a minimum risk to the fisherman.

A still further aim is to provide a device of the kind indicated which will be liable in a minimum degree to derangement and which may be readily serviced for replacement or repair of its parts.

Among the novel constructions sought, are: a safety device to secure the parts in inoperative position; a novel bait carrier release or trigger; a novel harpoon and operating means.

Additional objects, advantages and features of invention reside in the construction, arrangement and combination of parts of the device, as will appear from the following description and accompanying drawing of one embodiment of the invention, wherein Figure 1 is a perspective view of the device with the harpoon released and projected to its full stroke, the case cover being removed.

Figure 2 is a top view with the device in loaded position, the cover removed.

Figure 3 is a longitudinal section of the device loaded.

Figure 4 is a cross section at the trigger.

Figure 5 is a bottom view of the device encased.

Figure 6 is a side elevation thereof.

Figure 7 is a detail of the blank for the harpoon sleeve.

Figure 8 is a cross section of the cover detached.

Figure 9 is a detail of a modification.

There is illustrated a fish lure consisting of a base plate 10 and cover piece 11 forming a case of elongated shape. The cover includes a longitudinally extended slightly inclined tongue 13 at the forward end and on its sides 14 has fin vanes 15 curved suitably so that the tongue and vanes function to cause the assembly to move erratically like a spoon-bait, or gyrate, in ways designed to puzzle or attract fish when the case is drawn through the water at the end of a fish line.

On the base plate at each end there are formed short, upturned flanges 16 at the sides, adapted to fit within the downturned sides 14 of the cover, and at the forward end an upturned end wall portion 17 is formed, adapted to abut the cover when in place and formed with a flange 18 extended longitudinally outward to lie close against the top of the cover at the base of the tongue 13, parallel to the major plane of the case. The flange and cover are apertured as at 12 to receive an assembly screw 19 engaged through a cross bar 20, the ends of which project laterally beyond the case and carry loosely suspended flashers 21 shaped as spoons to oscillate when drawn through the water. The tail end of the case is slightly tapered, and the cover sides are extended and inturned as at 22, so as to receive and retain the respective flanges 16 of the base plate when the latter are laid between the sides of the cover at a distance from the end of the cover and then moved longitudinally into position until the apertures in flange 18 and tongue 13 register. This end of the cover is formed with a tail wall 23 suitably slotted at 24 (Fig. 8) to receive a harpoon 25 therethrough at times, as will be described, and to accommodate the snell and harpoon barb, to be described. The cover 11 has a longitudinal slot 11a for accommodation of an extended part of a safety device presently to be described.

A harpoon gun is mounted in the case, including a barrel 26 fixed medially within the case on the base 10, stopping short of each end of the case and leaving slightly more space at the tail end than at the head end. This barrel has longitudinal slots 27 at each side slightly spaced from a diametrical plane toward the plate 10. The harpoon is formed with a shank 28 fitted slidingly in the barrel, and a reduced neck portion 29 at the forward part to reduce weight and friction, and a conventional point 30 with pivoted barb 31 is formed at the extremity of the neck, the head and barb being accommodated in the space between the end of the barrel and the tail wall 23 when the harpoon is retracted or "loaded". The barb extremity may lie in a space laterally without and beside the barrel, if desired. The harpoon shank is provided at its inner extremity with lateral arms 32 extended through the slots of the barrel, and connected to the outer parts of these arms there are rubber bands 33 or other contractile members anchored under suitable tension to hooks 34 fixed on the plate 10 close to the sides of the case in the space at the tail end of the case. The arms 32 serve also as the means to stop the throw of the harpoon, by engaging against bumpers 35 of rubber or other cushion material set beside the barrel and slightly forward of the ends of the slots 27, so that they serve as silencers and to cushion the stopping of the harpoon.

The barrel may be secured in various ways, but as one means, there is shown a bracket frame 36 of sheet metal blanked as in Figure 7, having a central narrow part laid along the barrel opposite the plate 10, and having at the tail extremity a transverse portion recessed to set as a saddle 37 soldered or welded on the barrel end, and having arm portions extended downwardly on each side to the plate 10 to which they are secured by solder or otherwise, these arm portions being also shaped to form sockets beside the barrel into which the rubber blocks forming the bumpers 35 are set. The forward end of this bracket stops short of a trigger to be described and is formed with parallel longitudinally extended trigger mounting plates 38 closely spaced over the barrel and having downward extensions 39 soldered or otherwise united to the barrel. The lower edges of these plates are notched suitably to afford a pivotal mounting for trunnions 40 of a trigger 41, the body of which is substantially U-shaped inwardly of the trunnions and swings freely between the plates 38 between an erect set position vertical to the barrel and a release position nearly or quite parallel to the barrel.

A lock lever or detent 42 is pivoted at the forward end of the barrel, to swing downwardly longitudinally in close parallel relation to and over the barrel as in Figure 3, being formed with a sear 43 engaging through an aperture in the barrel with a notch 44 in the shank of the harpoon. The side of the sear engaged by the side of the notch in the shank is inclined sufficiently to cause the detent to be lifted out of the notch by pressure of the harpoon forwardly against the sear, unless the detent is held in engaged position, as will be described. The extremity of the detent is of a dimension to lie within the bight of the trigger when the latter is in erect or set position, so that the detent is held thereby in engaged relation to the harpoon shank, and the end of the detent is so shaped and positioned that the trigger may swing rearwardly from the end of the detent and so clear the latter for releasing movement away from the shank 28. The pivoted end portions of the trigger between the plates have a clearance thereunder over the barrel, approximately equal to the thickness of the material of the bracket 36.

A safety device is provided to positively fix the parts in set position so that the harpoon cannot be released by operation of the trigger, this consisting of a slide 45 on the detent rearwardly of the sear 43, the detent being considerably extended for this purpose and formed as a rectilinear bar of uniform transverse section throughout the extended part. The slide is formed with a rearwardly projected plate or tongue 46 under the detent and of a thickness to slide under the trunnions of the trigger between the plates 38 when the slide is pushed rearwardly, so that the tendency of the detent to lift when the trigger is released is opposed by the engagement of the tongue 46 under the trunnions of the trigger itself. A nib 45' is formed on the detent to limit movement of the slide 45 toward the end of the detent. As may be seen in Figure 4, the plates 38 and an extended portion of the slide 45 lie within the slot 11a of the cover.

In Figure 9, it is shown how a short, rearward extension 47 may be formed on the trunnions, so that when the tongue is pushed under the trigger, the latter is automatically set and is held against released movement at the same time that the detent is independently held in set position. This permits the movement of the safety slide out of safety position without having the harpoon shot at once but the harpoon will then be held in set or loaded position until the trigger is operated.

The bight of the trigger is formed with an aperture 48, through which may be engaged a snell 49 or other flexible pull device from a hook 50 suspended by this flexible connection just behind the tail end of the case, close beside the path of the point. Guides 51 may be formed on the bracket 36 for this snell or flexible connection consisting of upturned apertured ears struck from the material of the bracket. The slot 24 is suitably formed to provide for the free movement of the snell through the tail wall 23 of the case.

For attachment of the device to a fishing line, the line may be connected either to the slide 45 as at 52 in Figure 9, or to the forward end of the case. For the latter connection, I have shown apertures 53 in the end wall 17, through which respective ends of a short snell or string 54 are inserted from the outside and secured to anchor hooks 55 on the plate 10, thus forming a loop 56 beyond the case, to which a snell or line may be attached, as required.

In the use of this device, the elements being assembled as described, when it is desired to set the device for use, the point of the harpoon is rested against any convenient stationary body of resistant material, and the case pressed toward the point of the harpoon until the notch 44 moves under the sear 43; and while the pressure is maintained to hold the harpoon in this position, the detent is moved into place while the trigger is in released position and the trigger is immediately swung outwardly from the barrel and over the end of the detent to hold the latter in set position. If desired, to preserve the device from accidental release until the last moment before the device is submerged, the safety slide may be moved into safety position. The hook is baited in any usual manner before or after setting.

When angling, should a fish nibble at the bait, the least pull on the hook will operate the connection 49 and release the trigger, permitting the detent to lift from engagement with the harpoon shank and allowing the latter to be shot outward with great force by the rubber bands or other elastic devices 33. In order for a fish to operate the trigger normally, it will necessarily have its head directly to the rear of the case, so that the head of the fish will be penetrated by the harpoon, almost instantly killing the fish. In case of variation from normal, if the fish is not promptly killed, it will be greatly stunned or wounded so that its strength will soon be exhausted, and its capture facilitated.

It is not practicable to exclude water from the space in which the operative parts are mounted without objectionably impeding movement operatively and also adding to the weight of the article.

But the article may have buoyant elements incorporated by incorporating pieces of cork in clear spaces within the case not otherwise used, or other provision made for attachment or incorporation of cork or other buoyant element. Thus, in Figure 8 I have shown chambers 57 formed at the sides of the case which may be either air-tight and so serve as buoyant elements, or may be filled with cork to displace water.

Points at which solder has been applied in assembling the device as here disclosed are indicated as at 58'.

It should be noted that the sides 14 of the cover are projected longitudinally beyond the head wall 17, and the slots 58 are formed in these ends of the cover sides, the slots opening on the ends of the cover sides and lying immediately below the flange 18 when the parts are pressed snugly together. Consequently, when the bar 20 is put in place, it fits in the slots and serves thereby to prevent its bending readily, as well as causing it to hold the flange 18 snugly against the tongue 13. The screw 19 thus is not solely depended on to hold the case parts together, but serves more to prevent movement of the bar 20 out of the slots 58.

While I have shown and described a preferred construction, this is by way of illustration only, and I consider as my own all such modifications in structure as fairly fall within the scope of the appended claims.

I claim:

1. A device of the character described comprising a harpoon gun including resilient means to project the harpoon, a detent member operatively associated with the harpoon and alone yieldable to the harpoon when set, trigger means to hold the detent member in detaining relation to the harpoon, bait carrying means to operate the trigger, means to support the bait carrying means in close relation to the path of the point of the harpoon, and means to connect the device to a fishing line.

2. The structure of claim 1 in which said detent consists of a pivoted lever having a sear and the harpoon has a part to engage the sear to hold the harpoon against protraction from set position, a slide on the lever and means to interlock with the slide at one limit of movement of the slide when the lever is in set position.

3. The structure of claim 1 in which said detent consists of a pivoted lever having a sear engaging the harpoon to hold the harpoon against protraction from set position, and said trigger consists of a substantially U-shaped member pivoted at its extremities to swing over and receive the end of the lever within its bight portion, said bait carrying means including a connection to the bight of the trigger.

4. A device of the character described comprising a case, a harpoon gun barrel fixed therein stopping short of at least one end of the case, a harpoon having a shank slidable in the barrel, and having a point portion normally lying in the space between the gun barrel and the said end of the case, said end of the case having an opening for the passage of the harpoon freely therethrough, resilient means normally under tension to project the harpoon from the case when in set position in the case, trigger released means to hold the harpoon in set position, and bait carrying means to operate the trigger located close to the path of projection of the harpoon.

5. The structure of claim 1 in which said detent consist of a pivoted lever having a sear engaging the harpoon to hold the harpoon in set position and said trigger consists of a member pivoted to swing over and receive the lever thereunder, and having projections adjacent its pivot, and a safety slide on the lever having an extension to engage under said projections when in safety position.

6. A device of the character described comprising a base plate, a harpoon barrel fixed thereon having longitudinal slots at opposite sides, a harpoon having a shank slidable in the barrel and having arms extended through the respective slots, anchor hooks on the plate beyond one end of the barrel and opening away from the barrel, contractile members connected to the respective hooks and to the respective arms of the harpoon shank, and trigger release means to hold the harpoon in set position including a bait carrying operating means.

7. The structure of claim 6 in which cushion stops are fixed beside the barrel in the path of the arms of the harpoon shank near their limit of outward operative movement.

8. The structure of claim 6 comprising a mounting bracket having a saddle portion secured to the barrel and to said base plate so as to secure the barrel in place, the ends of the saddle having sockets adjacent the slots of the barrel, and rubber blocks set in the sockets, said bracket being extended forwardly and having the trigger of said trigger release means mounted thereon.

9. In a harpoon gun, a barrel mounting, trigger mounting and buffer mounting consisting of a base plate, a gun barrel, a bracket having a transverse saddle portion across the barrel and secured thereto and to the plate adjacent the discharge end of the barrel, longitudinal slots being formed in the barrel, said saddle portion having sockets therein at opposite sides of the barrel in advance of the ends of the slots, cushions in the sockets and beyond, a harpoon having a shank slidable in the barrel and arms on the shank slidable in the slots arranged to engage said cushions, contractile means connected to the arms and to the plate, said bracket being extended forwardly over the barrel, and having parallel plates thereon projected longitudinally, a trigger pivoted between the plates having a longitudinally swinging part open at the inner part, a detent lever pivoted beyond the trigger along the barrel and swingable in a plane with the medial axis of the barrel to lie with an extremity under said swinging part of the trigger in set position and coengaging parts on the harpoon and detent including a sear element operative to hold the harpoon in set position when the trigger is engaged with the detent, and bait carrying means operatively connected with the trigger.

10. The structure of claim 9 including a safety slide on the detent having an extension to engage under said trigger at one limit of sliding movement of the safety slide.

11. The structure of claim 1 including a case enclosing the operative parts but having a longitunal slot over the said trigger and detent, and a safety slide formed with an extended part projected through said slot of the case, and said fishing line connected to the safety slide and extended in the direction of release movement of the slide.

12. In a device of the character described, a harpoon gun device, bait carrying trigger operating means therefor, a case enclosing the operative parts comprising a base having the gun and operative parts mounted thereon, and a cover part, the base and cover having parts at one end interlocking by relative longitudinal movement to hold them in assembled relation and means to connect their opposite ends releasably.

13. The structure of claim 12 in which the last named means consists of parallel plate parts on the base and cover respectively, said cover having slide portions extended beside and beyond the parallel parts on the base and having slots, a cross bar engaged in the slots outwardly of the parallel parts of the base, and means to secure the bar releasably in place.

14. The structure of claim 12 in which the last named means consists of parallel plate parts on the base and cover respectively, said cover having slide portions extended beside and beyond the parallel parts on the base having slots, a cross bar engaged in the slots outwardly of the parallel parts of the base, and means to secure the bar releasably in place, said bar having end portions projected beyond the case laterally, and flasher devices swivelled thereon.

MAGNUS P. PALSSON.